(12) United States Patent  
Carcagno et al.

(10) Patent No.: US 9,004,544 B2  
(45) Date of Patent: Apr. 14, 2015

(54) THREADED JOINT FOR TUBES, PIPES AND THE LIKE

(75) Inventors: Gabriel E. Carcagno, Buenos Aires (AR); Alfredo Francisco Quiroga, Buenos Aires (AR)

(73) Assignee: Tenaris Connections Limited, Kingstown (VC)

( * ) Notice: Subject to any disclaimer, the term of this patent is extended or adjusted under 35 U.S.C. 154(b) by 161 days.

(21) Appl. No.: 13/264,731

(22) PCT Filed: Apr. 22, 2010

(86) PCT No.: PCT/IB2010/001603  
§ 371 (c)(1),  
(2), (4) Date: Oct. 14, 2011

(87) PCT Pub. No.: WO2010/122431  
PCT Pub. Date: Oct. 28, 2010

(65) Prior Publication Data  
US 2012/0032435 A1 Feb. 9, 2012

(30) Foreign Application Priority Data  
Apr. 22, 2009 (EP) .................................... 09158436

(51) Int. Cl.
| | |
|---|---|
| *F16L 25/00* | (2006.01) |
| *E21B 17/042* | (2006.01) |
| *F16L 15/00* | (2006.01) |
| *F16L 15/04* | (2006.01) |

(52) U.S. Cl.  
CPC ......... *E21B 17/0423* (2013.01); *E21B 17/0426* (2013.01); *F16L 15/003* (2013.01); *F16L 15/004* (2013.01); *F16L 15/008* (2013.01); *F16L 15/009* (2013.01); *F16L 15/04* (2013.01)

(58) Field of Classification Search  
USPC .................................. 285/333–334, 355, 390  
See application file for complete search history.

(56) References Cited

U.S. PATENT DOCUMENTS

| 1,590,357 A | 6/1926 | Feisthamel |
|---|---|---|
| 1,671,458 A | 5/1928 | Wilson |

(Continued)

FOREIGN PATENT DOCUMENTS

| AT | 388791 B | 8/1989 |
|---|---|---|
| CA | 2319926 | 7/2008 |

(Continued)

OTHER PUBLICATIONS

International Search Report dated Oct. 28, 2010 from PCT Application No. PCT/IB/2010/001603.

(Continued)

*Primary Examiner* — David E Bochna  
(74) *Attorney, Agent, or Firm* — Knobbe, Martens, Olson & Bear, LLP

(57) ABSTRACT

A threaded joint comprises a coupling, a first pin, and a second pin, wherein the thread of the first pin has a pitch different from the pitch of the thread of the second pin. The extremities of the pins have slanted contact surfaces of complementary shape that make mutual contact after make-up of the joint. The slanted common plane of contact of both pins has an angle to the plane perpendicular to the longitudinal axis of the joint which is greater than 0°. In an alternative embodiment the contact surfaces of the pins are split into two staggered planes and comprise a seal in-between.

23 Claims, 3 Drawing Sheets

(56) References Cited

U.S. PATENT DOCUMENTS

| | | | |
|---|---|---|---|
| 1,799,762 A | 1/1929 | Rathbun | |
| 1,999,706 A | 4/1935 | Spang | |
| 2,075,427 A | 3/1937 | Church | |
| 2,211,173 A | 8/1940 | Shaffer | |
| 2,487,241 A | 11/1949 | Hilton | |
| 2,539,057 A | 1/1951 | Brown | |
| 2,567,113 A | 9/1951 | Kristensen | |
| 2,631,871 A | 3/1953 | Stone | |
| 2,634,943 A | 4/1953 | Gulick | |
| 2,841,429 A | 10/1955 | McCuistion | |
| 2,766,998 A | 10/1956 | Watts et al. | |
| 2,916,306 A | 12/1959 | Rickard | |
| 2,992,021 A | 7/1961 | Nay | |
| 2,992,613 A | 7/1961 | Bodine | |
| 3,016,250 A | 1/1962 | Franck | |
| 3,041,088 A * | 6/1962 | Brandon, Jr. | 285/33 |
| 3,054,628 A | 9/1962 | Hardy et al. | |
| 3,150,889 A | 9/1964 | Watts | |
| 3,266,824 A | 8/1966 | Nealy | |
| 3,307,860 A | 3/1967 | Blount et al. | |
| 3,325,174 A | 6/1967 | Weaver | |
| 3,362,731 A | 1/1968 | Gasche et al. | |
| 3,489,437 A | 1/1970 | Duret | |
| 3,512,789 A | 5/1970 | Tanner | |
| 3,552,781 A | 1/1971 | Helland | |
| 3,572,777 A | 3/1971 | Blose et al. | |
| 3,599,931 A | 8/1971 | Hanson | |
| 3,733,093 A | 5/1973 | Seiler | |
| 3,810,793 A | 5/1974 | Heller | |
| 3,854,760 A * | 12/1974 | Duret | 285/334 |
| 3,889,989 A | 6/1975 | Legris et al. | |
| 3,893,919 A | 7/1975 | Flegel et al. | |
| 3,918,726 A | 11/1975 | Kramer | |
| 3,986,731 A | 10/1976 | DeHoff | |
| 4,014,568 A | 3/1977 | Carter et al. | |
| 4,147,368 A | 4/1979 | Baker et al. | |
| 4,219,204 A | 8/1980 | Pippert | |
| 4,299,412 A | 11/1981 | Parmann | |
| 4,310,163 A | 1/1982 | Pippert | |
| 4,345,739 A | 8/1982 | Wheatley | |
| 4,366,971 A | 1/1983 | Lula | |
| 4,373,750 A | 2/1983 | Mantelle et al. | |
| 4,384,737 A | 5/1983 | Reusser | |
| 4,406,561 A | 9/1983 | Ewing | |
| 4,426,095 A | 1/1984 | Buttner | |
| 4,473,471 A | 9/1984 | Robichaud et al. | |
| 4,475,839 A | 10/1984 | Strandberg | |
| 4,570,982 A | 2/1986 | Blose et al. | |
| 4,591,195 A | 5/1986 | Chelette et al. | |
| 4,592,558 A | 6/1986 | Hopkins | |
| 4,601,491 A | 7/1986 | Bell, Jr. et al. | |
| 4,602,807 A | 7/1986 | Bowers | |
| 4,623,173 A | 11/1986 | Handa et al. | |
| 4,662,659 A | 5/1987 | Blose et al. | |
| 4,674,756 A | 6/1987 | Fallon et al. | |
| 4,688,832 A | 8/1987 | Ortloff et al. | |
| 4,706,997 A | 11/1987 | Carstensen | |
| 4,762,344 A | 8/1988 | Perkins et al. | |
| 4,844,517 A | 7/1989 | Beiley et al. | |
| 4,856,828 A | 8/1989 | Kessler et al. | |
| 4,955,645 A | 9/1990 | Weems | |
| 4,958,862 A | 9/1990 | Cappelli et al. | |
| 4,988,127 A | 1/1991 | Cartensen | |
| 5,007,665 A | 4/1991 | Bovisio et al. | |
| 5,067,874 A | 11/1991 | Foote | |
| 5,137,310 A | 8/1992 | Noel et al. | |
| 5,143,381 A | 9/1992 | Temple | |
| 5,180,008 A | 1/1993 | Aldridge et al. | |
| 5,242,199 A | 9/1993 | Hann et al. | |
| 5,348,350 A | 9/1994 | Blose et al. | |
| 5,505,502 A | 4/1996 | Smith et al. | |
| 5,515,707 A | 5/1996 | Smith | |
| 5,712,706 A | 1/1998 | Castore et al. | |
| 5,794,985 A | 8/1998 | Mallis | |
| 5,810,401 A | 9/1998 | Mosing et al. | |
| 5,860,680 A | 1/1999 | Drijver et al. | |
| 5,879,030 A | 3/1999 | Clayson et al. | |
| 6,044,539 A | 4/2000 | Guzowski | |
| 6,045,165 A | 4/2000 | Sugino et al. | |
| 6,056,324 A | 5/2000 | Reimert et al. | |
| 6,070,912 A | 6/2000 | Latham | |
| 6,173,968 B1 | 1/2001 | Nelson et al. | |
| 6,347,814 B1 | 2/2002 | Cerruti | |
| 6,349,979 B1 | 2/2002 | Noel et al. | |
| 6,412,831 B1 | 7/2002 | Noel et al. | |
| 6,447,025 B1 | 9/2002 | Smith | |
| 6,478,344 B2 | 11/2002 | Pallini, Jr. et al. | |
| 6,481,760 B1 | 11/2002 | Noel et al. | |
| 6,494,499 B1 | 12/2002 | Galle, Sr. et al. | |
| 6,550,822 B2 | 4/2003 | Mannella et al. | |
| 6,557,906 B1 | 5/2003 | Carcagno | |
| 6,581,940 B2 | 6/2003 | Dittel | |
| 6,752,436 B1 | 6/2004 | Verdillon | |
| 6,755,447 B2 | 6/2004 | Galle, Jr. et al. | |
| 6,764,108 B2 | 7/2004 | Ernst et al. | |
| 6,814,358 B2 | 11/2004 | Keck | |
| 6,851,727 B2 | 2/2005 | Carcagno et al. | |
| 6,857,668 B2 | 2/2005 | Otten et al. | |
| 6,883,804 B2 | 4/2005 | Cobb | |
| 6,905,150 B2 | 6/2005 | Carcagno et al. | |
| 6,921,110 B2 | 7/2005 | Morotti et al. | |
| 6,971,681 B2 | 12/2005 | Dell'Erba et al. | |
| 6,991,267 B2 | 1/2006 | Ernst et al. | |
| 7,014,223 B2 | 3/2006 | Della Pina et al. | |
| 7,066,499 B2 | 6/2006 | Della Pina et al. | |
| 7,108,063 B2 | 9/2006 | Carstensen | |
| 7,255,374 B2 | 8/2007 | Carcagno et al. | |
| 7,284,770 B2 | 10/2007 | Dell'erba et al. | |
| 7,310,867 B2 | 12/2007 | Corbett, Jr. | |
| 7,431,347 B2 | 10/2008 | Ernst et al. | |
| 7,464,449 B2 | 12/2008 | Santi et al. | |
| 7,475,476 B2 | 1/2009 | Roussie | |
| 7,478,842 B2 * | 1/2009 | Reynolds et al. | 285/333 |
| 7,506,900 B2 | 3/2009 | Carcagno et al. | |
| 7,621,034 B2 | 11/2009 | Roussie | |
| 7,735,879 B2 | 6/2010 | Toscano et al. | |
| 7,753,416 B2 | 7/2010 | Mazzaferro et al. | |
| 8,215,680 B2 | 7/2012 | Santi | |
| 8,262,094 B2 | 9/2012 | Beele | |
| 8,262,140 B2 | 9/2012 | Santi et al. | |
| 8,333,409 B2 | 12/2012 | Santi et al. | |
| 8,544,304 B2 | 10/2013 | Santi | |
| 8,636,856 B2 | 1/2014 | Altschuler et al. | |
| 8,840,152 B2 | 9/2014 | Carcagno et al. | |
| 2002/0153671 A1 | 10/2002 | Raymond et al. | |
| 2003/0168859 A1 | 9/2003 | Watts | |
| 2004/0118490 A1 | 6/2004 | Klueh et al. | |
| 2004/0118569 A1 | 6/2004 | Brill et al. | |
| 2004/0195835 A1 | 10/2004 | Noel et al. | |
| 2004/0262919 A1 | 12/2004 | Dutilleul et al. | |
| 2005/0012278 A1 | 1/2005 | Delange | |
| 2005/0093250 A1 | 5/2005 | Santi et al. | |
| 2005/0166986 A1 | 8/2005 | Dell'erba et al. | |
| 2006/0006600 A1 | 1/2006 | Roussie | |
| 2006/0273586 A1 | 12/2006 | Reynolds, Jr. et al. | |
| 2007/0039149 A1 | 2/2007 | Roussie | |
| 2007/0246219 A1 | 10/2007 | Mannella et al. | |
| 2008/0264129 A1 | 10/2008 | Cheppe et al. | |
| 2008/0303274 A1 | 12/2008 | Mazzaferro et al. | |
| 2010/0181727 A1 | 7/2010 | Santi et al. | |
| 2010/0181761 A1 | 7/2010 | Santi et al. | |
| 2010/0187808 A1 | 7/2010 | Santi | |
| 2011/0008101 A1 | 1/2011 | Santi et al. | |
| 2011/0041581 A1 | 2/2011 | Santi | |
| 2011/0042946 A1 | 2/2011 | Santi | |
| 2011/0097235 A1 | 4/2011 | Turconi et al. | |
| 2011/0133449 A1 | 6/2011 | Mazzaferro | |
| 2011/0233925 A1 | 9/2011 | Pina | |
| 2011/0233926 A1 | 9/2011 | Carcagno | |

FOREIGN PATENT DOCUMENTS

| | | |
|---|---|---|
| DE | 3310226 A1 | 10/1984 |
| EP | 0 032 265 | 7/1981 |

(56) References Cited

FOREIGN PATENT DOCUMENTS

| | | |
|---|---|---|
| EP | 0 104 720 | 4/1984 |
| EP | 0 159 385 | 10/1985 |
| EP | 0 309 179 | 3/1989 |
| EP | 0 340 385 | 11/1989 |
| EP | 0 989 196 | 3/2000 |
| EP | 1 065 423 | 1/2001 |
| EP | 1 277 848 | 1/2003 |
| EP | 1 296 088 | 3/2003 |
| EP | 1 362 977 | 11/2003 |
| EP | 1 362977 | 11/2003 |
| EP | 1 705 415 | 9/2006 |
| EP | 1 726 861 | 11/2006 |
| EP | 2 000 629 A1 | 12/2008 |
| EP | 1554518 B1 | 1/2009 |
| FR | 1 149 513 A | 12/1957 |
| FR | 2 704 042 A | 10/1994 |
| FR | 2 848 282 A1 | 6/2004 |
| GB | 1 398 214 | 6/1973 |
| GB | 1 428 433 | 3/1976 |
| GB | 2 276 647 | 10/1994 |
| GB | 2 388 169 A | 11/2003 |
| JP | 58-187684 | 12/1983 |
| JP | 07-139666 | 5/1995 |
| WO | WO 84/02947 | 8/1984 |
| WO | WO 94/29627 | 12/1994 |
| WO | WO 96/22396 | 7/1996 |
| WO | WO 00/06931 | 2/2000 |
| WO | WO 01/75345 | 10/2001 |
| WO | WO 02/29290 | 4/2002 |
| WO | WO 02/35128 | 5/2002 |
| WO | WO 02/068854 | 9/2002 |
| WO | WO 02/086369 | 10/2002 |
| WO | WO 02/093045 | 11/2002 |
| WO | WO 03/087646 | 10/2003 |
| WO | WO 2004/033951 | 4/2004 |
| WO | WO 2004/053376 | 6/2004 |
| WO | WO 2006/087361 | 4/2006 |
| WO | WO 2007/002576 | 1/2007 |
| WO | WO 2007/017082 | 2/2007 |
| WO | WO 2007/017161 | 2/2007 |
| WO | WO 2007/028443 | 3/2007 |
| WO | WO 2007/063079 | 6/2007 |
| WO | WO 2008/090411 | 7/2008 |
| WO | WO 2009/000851 | 12/2008 |
| WO | WO 2009/000766 | 1/2009 |
| WO | WO 2009/010507 | 1/2009 |
| WO | WO 2009/027308 | 3/2009 |
| WO | WO 2009/027309 | 3/2009 |
| WO | WO 2009/106623 | 9/2009 |
| WO | WO 2010/122431 | 10/2010 |

OTHER PUBLICATIONS

Chang, L.C., "Microstructures and reaction kinetics of bainite transformation in Si-rich steels," XP0024874, Materials Science and Engineering, vol. 368, No. 1-2, Mar. 15, 2004, pp. 175-182, Abstract, Table 1.

"Specification for Threading, Gauging and Thread Inspection of Casing, Tubing, and Line Pipe Threads," American Petroleum Institute, Specification 5B, Apr. 2008, 15th Edition (Excerpts Only).

The ongoing prosecution history of U.S. Appl. No. 11/546,974, filed Nov. 5, 2003, including without limitation Office Actions, Amendments, Remarks, and any other potentially relevant documents.

The ongoing prosecution history of U.S. Appl. No. 12/665,902, filed Dec. 21, 2009, including without limitation Office Actions, Amendments, Remarks, and any other potentially relevant documents.

The ongoing prosecution history of U.S. Appl. No. 12/665,921, filed Dec. 21, 2009, including without limitation Office Actions, Amendments, Remarks, and any other potentially relevant documents.

The ongoing prosecution history of U.S. Appl. No. 12/669,177, filed Jan. 14, 2010, including without limitation Office Actions, Amendments, Remarks, and any other potentially relevant documents.

The ongoing prosecution history of U.S. Appl. No. 12/673,833, filed Feb. 17, 2010, including without limitation Office Actions, Amendments, Remarks, and any other potentially relevant documents.

The ongoing prosecution history of U.S. Appl. No. 12/674,800, filed Feb. 23, 2010, including without limitation Office Actions, Amendments, Remarks, and any other potentially relevant documents.

The ongoing prosecution history of U.S. Appl. No. 12/920,085, filed Aug. 27, 2010, including without limitation Office Actions, Amendments, Remarks, and any other potentially relevant documents.

The ongoing prosecution history of U.S. Appl. No. 12/954,588, filed Nov. 24, 2010, including without limitation Office Actions, Amendments, Remarks, and any other potentially relevant documents.

The ongoing prosecution history of U.S. Appl. No. 13/072,533, filed Mar. 25, 2011, including without limitation Office Actions, Amendments, Remarks, and any other potentially relevant documents.

The ongoing prosecution history of U.S. Appl. No. 13/073,917, filed Mar. 28, 2011, including without limitation Office Actions, Amendments, Remarks, and any other potentially relevant documents.

* cited by examiner

THREADED JOINT FOR TUBES, PIPES AND THE LIKE

CROSS-REFERENCE TO RELATED APPLICATIONS

This application is a U.S. National Phase of PCT International Application No. PCT/IB2010/001603, filed Apr. 22, 2010 and published as WO 2010/122431 on Oct. 28, 2010, which claims priority to European Application No. 09158436.7, filed Apr. 22, 2009. The disclosure of both prior applications is incorporated by reference in their entirety and should be considered a part of this specification.

FIELD OF THE INVENTION

The present invention relates to a threaded joint or connection for tubes, pipes and the like, in particular for connecting tubes of predefined length to make strings used in the hydrocarbon industry, especially for use in the field of OCTG (Oil Country Tubular Goods), for use in drilling especially in applications where it is preferable that said pipes do not rotate during make-up operations, and in line pipes.

BACKGROUND OF THE INVENTION

Searching for oil or, more generally, hydrocarbons has become more demanding in terms of hardware and devices in recent years because oil and gas fields or reservoirs are located deeper under the earth's surface or in places difficult to reach. Prospecting for and exploitation of hydrocarbon fields demands hardware which can withstand higher loads and ensures optimal sealability. The market for so-called premium connections is increasing and research is being carried out to offer new improved joints to meet market needs.

A primary design requirement for threaded joints is to resist high load torques to ensure that during drilling or running operations, the joint does not fail due to over-torque (i.e. to resist higher torques than connections of similar materials and wall thickness/geometry). However designing joints having good resistance to high loads generally means that high torques are required during make-up operations, at least in the last part of the make-up operation, just before the abutment shoulder is energized with danger of plastic deformation of the metal in the joint portions. In this part of the make-up there is also the danger of causing galling between sealing surfaces.

Attempts have been made to improve joint capacity to achieve a reduced make-up torque combined with high resistance to breakout, as well as to achieve a connection that can be made up with no rotation of the tubular sections, but by rotating only the coupling.

U.S. Pat. No. 5,794,985 discloses a threaded pipe connection for connecting two segments of pipe having externally threaded pin members, one pin member having external right-hand threads and the other pin member having left-hand threads. An internally threaded coupling has two portions having respectively right and left-hand threads that mate with the threading on the respective pin members. A plurality of mating lugs and grooves on the ends of the pin members hold the pins from relative rotation when the connection is being made up. Making up the coupling in the last part of the operation causes a translation of the pins parallel to their axis in mutually opposite directions so that the lugs of the pin extremities enter one into another and prevent rotation of one pin relative to the other. A metal-to-metal seal located between each pin member and the coupling adjacent each end of the coupling isolates the threads of the connection from the ambient environment, thus sealing the pipe annulus against external pressure due to hydrostatic head.

U.S. Patent Application Publication No. 2006/0273586 discloses a threaded joint comprising a first pin nose comprising a nose surface, a shoulder and a seal surface therebetween, a second pin nose comprising a nose surface, a shoulder and a seal surface corresponding to the first pin seal surface, and a mating coupling with an inner seal support. Upon a determined make-up the first pin nose is in an overlapping axial position with the second pin nose such that contact occurs between the first pin nose surface and the second pin shoulder surface acting as a positive-stop torque shoulder, with contact occurring between the first pin seal surface and the second pin seal surface, to form a seal therebetween. The inner seal support is in an overlapping axial position to the first pin nose and the second pin nose, with a selected diametrical gap existing between the inner seal support and the first pin nose and second pin nose.

The threaded joint can be made-up with substantially no relative rotation between the first and second tubular sections. One among the first pin nose surface and the second pin nose surface is castellated, in a similar fashion to a slotted nut, with the corresponding second pin nose shoulder or first pin nose shoulder being correspondingly castellated.

To finish connection make-up, both tubular sections may be restrained from rotating relative to each other while the coupling is rotated. The different thread pitches cause the pin noses to be brought together axially without relative rotation between the tubular sections. Torque continues to be applied to the coupling until the selected make-up is achieved.

The solution proposed by U.S. Pat. No. 5,794,985 relates to threaded pipe connections with thread designs having one pin with left hand threaded end and the second pin with right hand threaded end, where both have the same pitch and taper.

The solution provided by U.S. Patent Application Publication No. 2006/0273586 relates to threaded pipe connections having both threads with the same hand but different pitches, and a coupling with a seal inner support having a gap between said inner support and the interlocking pin noses.

Both solutions cited above are unsatisfactory because some problems remain unsolved. A first problem is handling fragility due to the castellated pin ends and inner seal support. In fact if a lug or a groove of a castellated pin end is hit and bent during the handling of the pipe in the yard, the make-up will be much more difficult, with the risk of cross threading and galling increasing dramatically. It may also harm the internal flush or drift.

Another problem relates to manufacturing, because the lugs and grooves, as well as the inner seal support, have to be machined with very precise tolerances, increasing the cost of the connection and the time needed to machine it. Moreover it is technically complicated to cut a right handed thread and a left handed thread at the same time. It is impractical from the cost aspect.

Still another problem is encountered during joint make-up in both solutions of the state of the art. First of all there is a danger of galling the seal surfaces, and plastic deformation of the pin noses, seal surfaces or shoulder surfaces during make-up of the connection. There is a need for a high make-up torque to achieve a good resistance to high working loads, which enhances the risk of the aforementioned problems.

Moreover, to make-up the castellated pin ends, a very good alignment of the mating lugs and grooves from both pin ends and from the coupling is needed.

U.S. Pat. No. 4,762,344 discloses a connection with one of the pipe ends having threads of a pitch that is greater than the pitch of the threads on the other pipe end, and the connector threads have corresponding thread pitches. The disclosed arrangement permits the connection to be assembled to the point short of relative sliding movement between the complementary sealing surfaces on the pipe ends and final tightening is accomplished by restraining the respective pipes from relative rotation while rotating the connector to draw the two pipe ends together into compressive sealing engagement without relative sliding in order to prevent galling of the sealing surfaces. The inclined frustoconical end surfaces of both pipe sections have their virtual vertex lying on the pipe axis. The inclination of each of the frustoconical end surfaces is such that they are obliquely positioned in the same orientation relative to the pipe axes. The angles of the frustoconical end surfaces are slightly different by an angular value of 2° to 5°, to cause the pipe ends, or the pipe ends and the metallic annular sealing rings, depending upon the embodiment being considered, to first make contact at inner edges when the ends are drawn together. Thus the resulting seal commences at the innermost part of the junction and progresses to the exterior of the junction as the axial pressure between the pipe ends increases by virtue of the continued rotation of connector to draw the pipe ends together.

SUMMARY OF THE INVENTION

It is therefore a main object of the present invention to provide a joint for connecting tubes, pipes and the like which overcomes the aforementioned drawbacks and has a very high resistance to breakout and a high torque capacity while offering easy manufacture and a simple and reliable initial make-up operation, i.e. with a very low make-up torque or even with only hand-tight make-up, so reducing problems arising during make-up.

Another object of the invention is to provide a joint with a high resistance to those forces which could result in a torque-inducing breakout.

It is also an important object of the invention to provide an alternative design for a joint with which several other functions required in threaded joints can be combined.

The above mentioned objects are achieved in accordance with a first aspect of the invention by means of a threaded joint comprising a female threaded sleeve, defined as the coupling, a first male pipe with a respective threaded end portion, defined as first pin, and a second male pipe with a respective threaded end portion, defined as second pin, the first pin being configured to be made up in a first threaded portion of the coupling and the second pin being configured to be made up in a second threaded portion of the coupling so as to be axially aligned on a common longitudinal axis, wherein the threaded end portion of the first pin has a pitch different from the pitch of the threaded end portion of the second pin, the coupling having a thread of the first threaded portion mating with a thread of the threaded portion of the first pin, and a thread of the second threaded portion mating with the thread of the threaded portion of the second pin, the extremity of the first pin comprising at least one respective contact surface and the extremity of the second pin comprising at least one respective contact surface, the contact surface of the first pin and the contact surface of the second pin being in mutual contact after the joint is made up, the contact surface of the first pin and the contact surface of the second pin lying on a plane forming an angle $\alpha$ with a plane perpendicular to the longitudinal axis of the joint, the angle $\alpha$ being greater than 0°.

According to a further aspect of the invention the mentioned objects are achieved by means of a method comprising the steps of:

a) performing a first make-up operation in which the first pin with larger pitch threading is inserted into the first extremity of the coupling until a position of the first pin is reached which is deeper within the coupling than a position determined by a final made up design position of the joint, b) performing a second make-up operation in which the second pin with smaller pitch threading is inserted into the second extremity of the coupling until respective contact surfaces of first and second pins engage, c) rotating the coupling about its axis on both first and second pins to unscrew the coupling in the direction from the first pin to the second pin, whereby for each incremental angular turn of the coupling an axial displacement of the second pin forward of the coupling occurs which is longer than the axial displacement of the first pin rearward of said coupling.

The joint according to the invention has two mating threaded pin ends inserted into a coupling shaped as a sleeve. The thread pitch of one pin end is different from the thread pitch of the other pin end belonging to the joint. With regard to the coupling, each coupling side of the sleeve has a thread not only of the same shape, but also of the same pitch so that each coupling end matches the corresponding pin end.

The shape of the extremity of each of the two mating pins has a slanted/oblique shape, also known as horse-shoe type because of its typical shape. When the joint is made up with a relatively low make-up torque, or with a very low value of make-up torque, even with a torque produced by mere hand tightening (i.e. a make-up torque approaching zero magnitude, except for the friction generated by the surfaces in contact), the slant shaped pin ends act as blocking elements, increasing the magnitude of the torque needed to make the connection fail.

Moreover, while prior art solutions with castellated pin extremities require a perfect alignment between mating lugs and grooves, the present invention does not require a perfect alignment, since it is self-aligning because of the wedge effect produced by the contact surfaces of the pins. Even though the elliptical surfaces, i.e. the contact front surfaces of the slant shaped pin ends, need to be in contact for the joint to be made up, this contact is automatically reached during the make-up. The mating surfaces slide one on the other to achieve alignment in the last stage of the make-up operation.

The threaded end portion of the first pin has a larger pitch, i.e. the first pin has a high number of threads per inch, while the threaded end portion of the second pin has a smaller pitch pin, i.e. the second pin has a low number of threads per inch. Therefore, the first pin has a number of threads per inch higher than the number of threads per inch on the second pin, or vice versa. It is appreciated by a person skilled in the art that it is a matter of choice to decide which is the pin with larger pitch and the pin with smaller pitch. In a preferred embodiment of the present invention, the joint includes a back nut, also known as a self-locking nut. The back nut is placed between the pipe body of the larger pitch pin and the coupling or sleeve. When the back nut is tightened towards the coupling during the make-up operation, it becomes a mechanical locking element with a very high torque being needed to make the connection fail or open. In this case the joint reaches its characteristics of excellent resistance to over-torque from the synergy created by the slant shaped ends combined with the back nut, even in cases when the joint is made up with a relative low make-up torque or even when only hand tightening is used.

In a preferred embodiment of the present invention the threaded portion at the extremity of one pin has a slight taper which is different from the taper of the threaded portion at the extremity of the other pin of the joint. An advantage of this difference in taper is to achieve further energization in the joint for make-up and break-out torques.

According to another embodiment of the present invention, in order to achieve better joint sealability, the slanted surfaces of the two pins can be formed in two steps, the slanted surfaces of the pins being offset into the wall thickness about the longitudinal axis of the joint. With such configuration, both pin noses have two mating shoulder surfaces (an inner and an outer shoulder surface) and a seal surface transversal to the two shoulder surfaces. The two mating shoulder surfaces are slanted with substantially the same slant angle. However, alternatively the slant angle of the plane corresponding to one shoulder may be different from the angle of the second shoulder.

To make shoulders and seal surfaces, the slanted end surface is machined in two steps, so that the first slant surface acts as the outer shoulder, the second slant surface acts as the inner shoulder and the transversal surface acts as the metal to metal seal.

It will be appreciated by a person skilled in the art that in this embodiment these slanted shoulder surfaces do not act as positive stop-torque shoulders, and do not increase the make-up torque of the joint. Despite this fact, both slanted shoulder surfaces act as divided slant shaped pin ends, so that when the connection is made up with a relative low make-up torque, these slant shaped pin ends act as locking elements, increasing the torque needed to make the connection fail and increasing the sealability of the joint.

The two-step slant shaped pin ends act in the same way as the slanted surface of the first embodiment, but the offset of the slanted surfaces provides a seal surface. The two slanted surfaces are machined into the wall thickness of the pipe. These slanted surfaces do not comprise lugs and grooves or castellation.

The seal surfaces may have different shapes:
Frustoconical surfaces with taper angle between 1° and 20°, with the same taper angle or different taper angle,
Curved surfaces, preferably spherical seal surfaces,
Cylindricscrewal surfaces.

Those skilled in the art will appreciate that enhanced sealability is reached with the combination of two seal surfaces, one frustoconical and one curved, because combining two kinds of surfaces guarantees the metal-to-metal contact in at least one point. Nevertheless, any combination of seal surfaces can be made depending on the particular objectives one intends to reach.

The joint of the present invention has the advantage of being more reliable in real field operative conditions and more flexible in its use when the pipe string must withstand over-torque of greater magnitude.

In view of its specific structure, the joint has a preferred method for make-up.

a—The coupling is pre-mounted onto the first pin with a thread having larger pitch. If a back nut is used, it is placed between the pipe body and the coupling.

b—The second pin, with pitch smaller than the pitch of the first pin, is screwed onto the joint only until the first few threads are engaged.

c—The coupling is then rotated in the direction to unscrew it from the pin with larger pitch. Due to the difference in pitch, both pins are forced to approach each other during this rotation. The final make-up is subsequently performed by unscrewing the coupling from the pin having a larger thread pitch, in the direction of the pin having a smaller thread pitch. The difference in pitch of the two pins causes the two pins to abut since they displace axially differently one from the other. The last part of the rotation of the coupling energizes the nose of one pin against the nose of the other pin and also energizes both pins against the thread of the coupling. The slanted shape of the pin ends creates a wedge effect between the pin noses.

d—In those embodiments in which a back nut is used, the make-up operation finishes by screwing the back nut against an extremity of the coupling.

Moreover, if the joint is provided with metal-to-metal seals, i.e. in the case in which the slant shaped surfaces of the pin ends are made in two steps, said last rotation of the coupling guarantees the shoulder contact and energizes the seal, increasing the sealability of the joint.

If a back nut is tightened towards the coupling at the end of the make-up process, it becomes an additional mechanical locking element and an even higher torque would be needed to make the joint fail than for other known joints.

The joint, the object of the present invention, can be used, for example, but not exclusively, to make:
Tool joints for drilling;
Casings for drilling in directional operations;
OCTG pipes, instead of using premium connections;
Applications where pipes should not rotate.

BRIEF DESCRIPTION OF THE DRAWINGS

The foregoing and other objects of the invention will become more readily apparent by referring to the following detailed description and the appended drawings in which.

DETAILED DESCRIPTION OF PREFERRED EMBODIMENTS OF THE INVENTION

Figure 1:
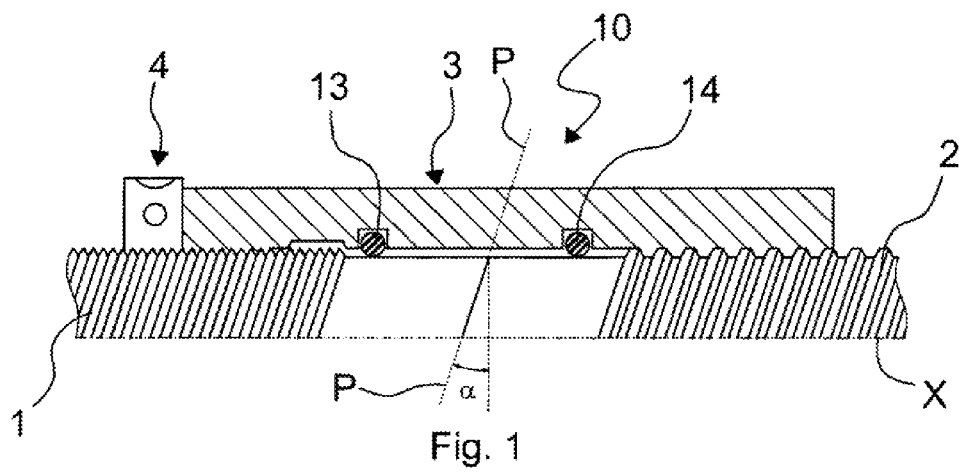
FIG. 1 shows a section along an axial plane of a joint according to the invention.
Figure 2:
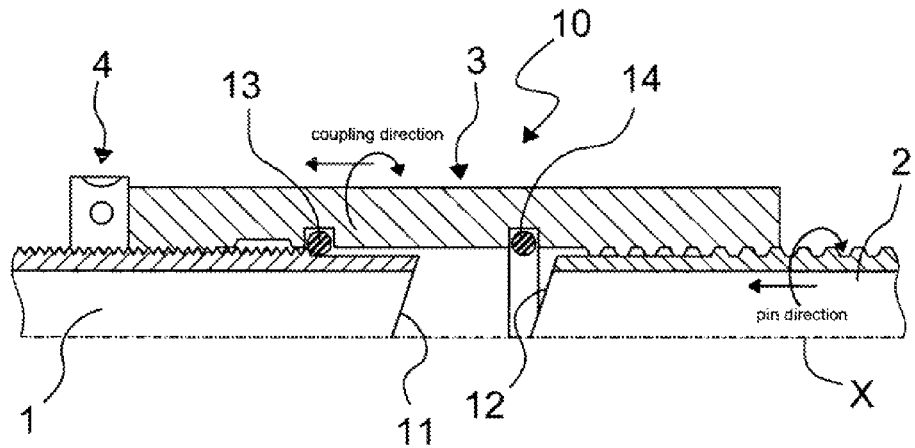
FIG. 2 shows a section along an axial plane of a joint according to the invention, in a first step of the make-up operation.

With particular reference to the figures, the joint of the invention, indicated globally with reference numeral 10, comprises a first pin 1 having a larger pitch thread and a second pin 2 having a smaller pitch thread, and a mating coupling 3 forming the coupling of the joint. In a first embodiment of the joint, shown in a made up position in FIG. 1, slanted shaped ends of both pins are in mutual contact. A back nut 4 can be advantageously used to prevent the connection from opening due to over-torques. More precisely, the combination of the effects of the slanted shaped pin ends and the use of the back nut 4 provides a joint that can support extremely high torques.

Although the joint 10 can have the threaded portions of both pins 1 and 2 cylindrically shaped, better performances are obtained when at least one pin, e.g., pin 2 is tapered in the threaded portion, with a taper angle to the joint axis X of at least a few degrees, corresponding to an inclination between 6.25% and 8.50% of the diameter, while pin 1 is cylindrical in its taper, i.e. its taper is 0°. In this embodiment there is the advantage that the taper of pin 2 ensures energization of the joint on that side, while pin 1, despite not being energized, is prevented from rotating by the back nut 4. In this manner pin 1 need not be energized and a simpler design for pin 1 and coupling 3 on its portion mating with pin 1 can be chosen.

This gives the advantage of a simpler design for that part of the joint, and other additional measures that are generally present in state of the art joints to enhance energization can be avoided.

In another preferred embodiment both pins 1 and 2 are designed with threaded portion tapers that are different from each other. Both pins 1 and 2 have a predetermined energization, so they are prevented from rotating, and the back nut 4, if present, only reinforces the mechanical strength of the joint 10.

In order to enable make-up of the joint 10, the thread of the two pins 1 and 2 is designed in such a manner that the threading of pin 1 results in a thread pitch different from the thread pitch of pin 2 but with the same thread orientation, i.e. either both portions of the coupling 3 are right handed or both are left handed.

A particularly advantageous example of thread pitch ratio between pin 1 and pin 2 is a pitch of 8 threads per inch on pin 1 and a pitch of 4 threads per inch on pin 2. The threading of both pins 1 and 2 can be designed with either right-hand or left-hand thread, whereby both solutions provide the same advantages.

The joint of the invention has to be appropriately mounted, in a manner different from the generally adopted make-up operation for state of the art joints. The method for mounting the joint 10 comprises the following steps:

a)—The coupling 3 is pre-mounted onto the larger pitch pin 1.
In the embodiment where the back nut 4 is used, the back nut is placed between the pipe body and the coupling 3, before this step.

b)—The other pin 2 (with smaller pitch threading) is screwed onto the coupling 3 only until the first few threads are engaged.

c)—The coupling 3 is then rotated about its axis. Due to the difference in pitch, both pins 1 and 2 are forced to approach each other. The final make-up is performed by unscrewing the coupling 3 in the direction from the larger pitch end of pin 1 to the smaller pitch end of pin 2. The difference in pitch between the pins 1 and 2 causes the pin ends to abut. Because of the larger pitch of the thread of pin 1 compared with the thread of pin 2, an incremental angular turn of the coupling 3 about pin 1 results in a smaller axial displacement of pin 1 away from pin 2 than the axial displacement of the pin 2 into coupling 3 towards pin 1. In other words the unscrewing of the coupling 3 with respect to pin 1 is less than the screwing of the same coupling 3 with respect to pin 2.

Figure 3:
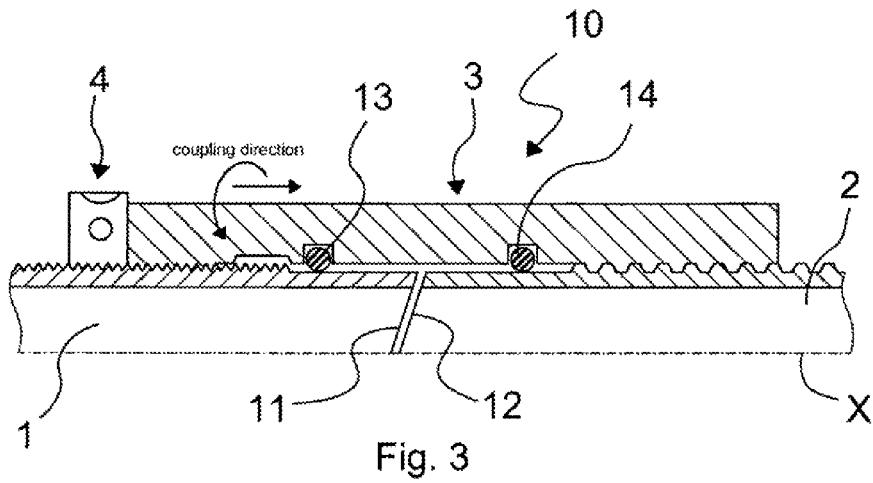
FIG. 3 shows a cross section along an axial plane of the joint of the present invention in another step of the make-up operation.

As the number of threads per inch in pin 1 is larger than in pin 2, the axial displacement of pin 1 rearward is less than the axial displacement of pin 2 forward, so that the pins are made to abut unscrewing the coupling from the larger pitch pin to the smaller pitch pin. This is shown in FIG. 3.

This last rotation of the coupling 3 brings pin 1 close to pin 2 and also energizes one pin against the other and both pins against the coupling thread.

In the embodiment in which the back nut 4 is used, the make-up operation finishes with a further step:

d)—screwing of the back nut on the pin 1.

In this final made up position, the last step of the make-up operation is the tightening of said back nut towards the coupling 3. When the back nut is tightened towards the coupling 3 in the make-up process, it becomes a mechanical locking element, a very high torque then being required to make the connection fail or open.

Figure 4:
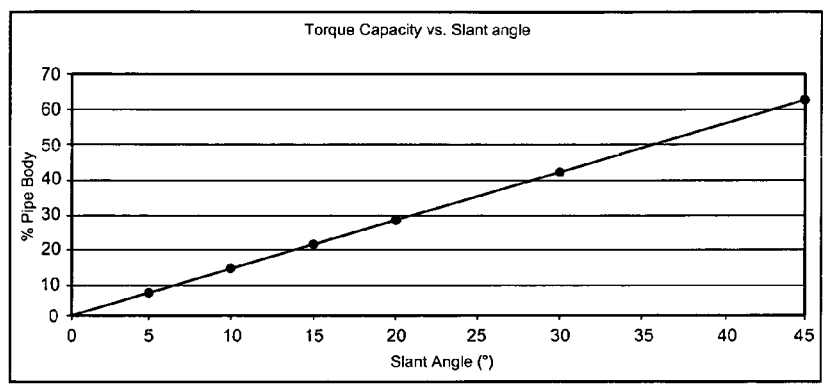
FIG. 4 is a graph showing the torque capacity increase of a joint of the invention (in percentage of the pipe body)

When the slant-shaped pin ends are intermeshed as far as their final abutment, the joint 10 can withstand extra high torques, whose magnitude is determined by the yield resistance of the pipe material, as shown in FIG. 4.

Advantageously, when the threaded portion of either one or both of pins 1 and 2 has a taper, this contributes to enhancing the capacity of the joint to better resist over-torque.

In order to ensure a proper make-up operation, design of the slant-shaped pin ends has to be appropriately defined. Tests made on different designs shows that increasing the slant angle $\alpha$, shown in FIG. 1, results in higher failure torques for the connection. This influence of the slant angle $\alpha$ is shown by the graph of FIG. 4. It must be noted that for $\alpha=0°$ there is no increase of torque capacity, so that the joint has a torque capacity of around 10%-15% of the pipe body, a standard value for an API joint.

Taking into account the standard values of torque resistance of an API joint, of a premium joint and of a wedge joint shown in the chart below, it can be seen that the joint of the present invention reaches torque capacities superior to other known solutions, even with wedge threads of the known art, but with a configuration much simpler, more economical and stronger.

| Comparative Table | |
| --- | --- |
| Type of connection | Torque capacity (% pipe body) |
| API | 5%-10% |
| Premium | 10%-20% |
| Wedge | 30%-40% |

Note: Here the stated wedge is not the connection of the invention, but another type of premium joint with high torque capacity.

As can be seen in the graph of FIG. 4, the joint the object of the present invention has a torque capacity similar to or higher than a wedge thread, without the cost and fabrication problems of a wedge.

Figure 2A:
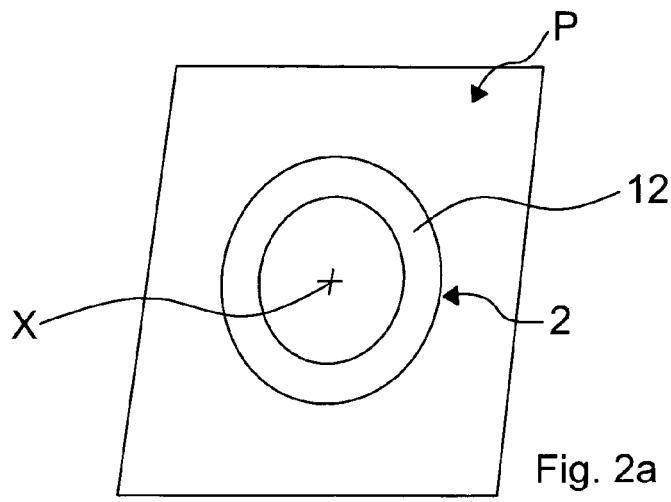
FIG. 2*a* shows an axial view of a pin used in the joint of FIG. 2.

The upper limit for the slant angle $\alpha$ of the contact end surfaces 11 and 12 of the pins 1 and 2 is related to the wall thickness of the pipe, because a very slender pin nose can cause a plastic instability phenomenon at the moment of make-up. Moreover, a larger slant angle $\alpha$ entails making a longer joint, which is undesirable, because of the mentioned problems. Preferably the angle $\alpha$ should be in the range between 0 and 45°, but slightly bigger than 0°, i.e. the plane P must always have an oblique or sloping direction in respect of the axis (X). Still more preferably, the angle $\alpha$ should be in the range between 15 and 30°. In this manner, the contact end surfaces 11 and 12 define an annulus of elliptic shape when viewed in a direction perpendicular to the plane P as shown in FIG. 2a.

Said plastic instability phenomenon can be reduced by using the joint to provide hoop containment to the pin, therefore increasing the resulting resistance of the pin. This requires that the radial gap between pin and coupling be kept to a smaller value than in other cases without instabilities.

In appropriate parts of the joint, when fluid dope is used to lubricate the joint at make-up, annular cavities, not shown in the figures, can be provided for dope pressure compensation. These annular grooves can be generally placed at one or at both extremities of the threaded portion of either the pin or the coupling.

It will be appreciated that a further advantage of the joint of the invention is that any kind of thread profile can be used without detracting from the advantages of the joint. The thread profile can therefore be round, of buttress type or the like.

The joint of the invention has several advantages, because it can be combined with several important technical features which are important when using the joint in specific environments. The joint, if appropriate, can incorporate either dope-free technology or ordinary dope.

If necessary, when used in specific adverse environments, seals are provided in different positions in the joint, with annular sealing surfaces of metal-to-metal type and/or elastomeric seal rings 13, 14 positioned in the inner, outer or middle region of the coupling 3 with respect to the threaded portions.

As shown by the embodiments of FIGS. 5a, 5b, 6a, 6b, 6c a metal-to-metal seal 8, 18 can also be incorporated in pins 1' and 2' of joint 20. The extremity of pin 1' has two slanted surfaces 7, 9 made in two steps offset into the pipe wall thickness along the longitudinal axis X of the joint, lying both on two planes P and P' parallel one to the other or slightly convergent to each other. Both planes P and P' have an oblique or sloping direction in respect of the axis X, respectively of angles α and β, which can have the same values or be of slightly different values. Likewise the extremity of pin 2' has two slanted surfaces 17, 19 made in two steps offset into the pipe wall thickness about the longitudinal axis X of the joint, complementary to the end surfaces 7, 9 of pin 1'. The surfaces 7 and 17 form two first mating shoulder surfaces, and similarly surfaces 9 and 19 form two second shoulder surfaces, which in a view in a direction perpendicular to the planes P and P' appear as annuli of elliptic shape.

Figure 6:
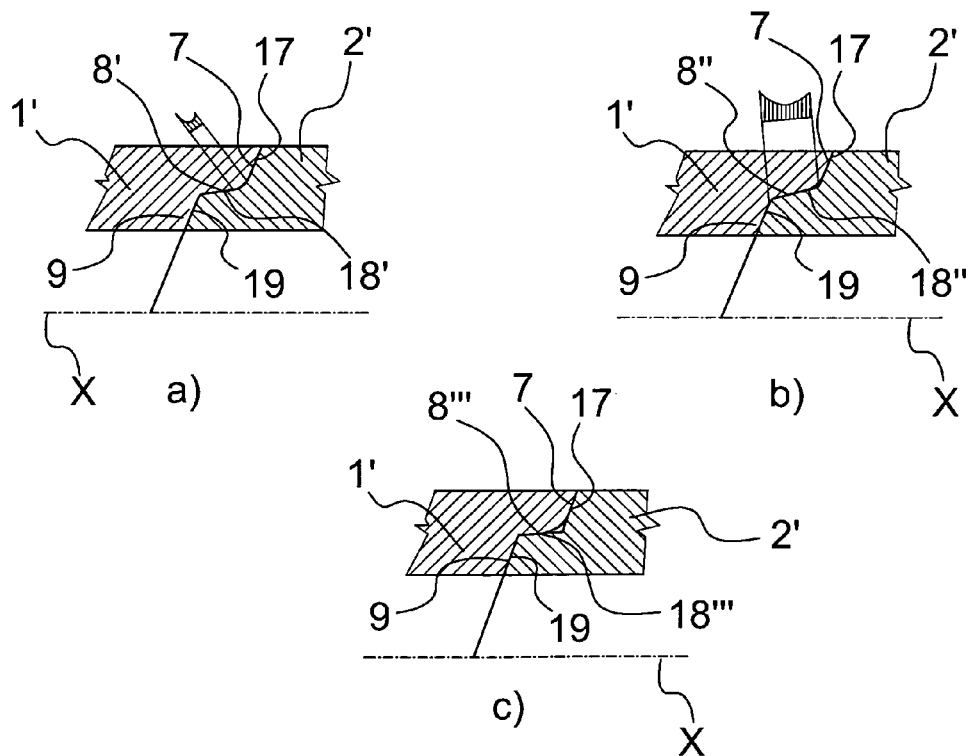

The cylindrical surfaces 8 and 18 transversal to the two shoulder surfaces 7, 9 and, 17, 19 are designed as a seal, preferably metal to metal. Advantageously the seal surfaces can have different shapes from cylindrical:

Frustoconical surfaces 8', 18' and 8", 18", with taper angle between 1° and 20°, with the same taper angle or different taper angle, (embodiments of FIGS. 6a, 6b), one or both curved surfaces 8''', 18''', preferably spherical or torroidal surfaces, (embodiment of FIG. 6c). In this case, with such combination of frustoconical and curved surfaces an improved sealability is reached.

The shoulder surfaces 7 and 9 of the first pin 1' are slanted with the angle α of same magnitude, and so are the complementary surfaces 17, 19 of the second pin 2'. Alternatively the slant angle α of the planes 7, 17 corresponding to a first shoulder, can be made different from the angle β of the second planes 9, 19, defining the second shoulder.

Figure 5B:
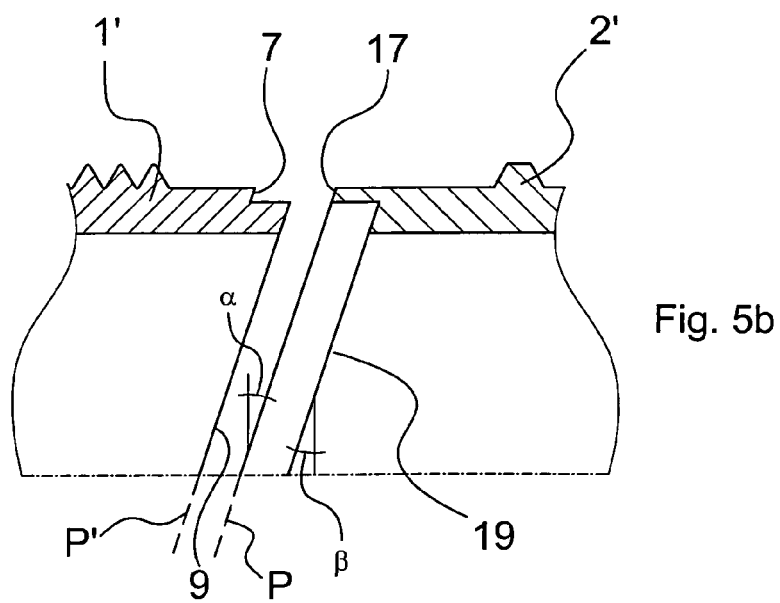
FIG. 5*b* shows an enlarged view of a detail of the FIG. 5*a*, FIGS. 6*a*, 6*b* and 6*c* respectively show enlarged views of three embodiments of detail B of FIG. 5*b*.
Figure 5A:
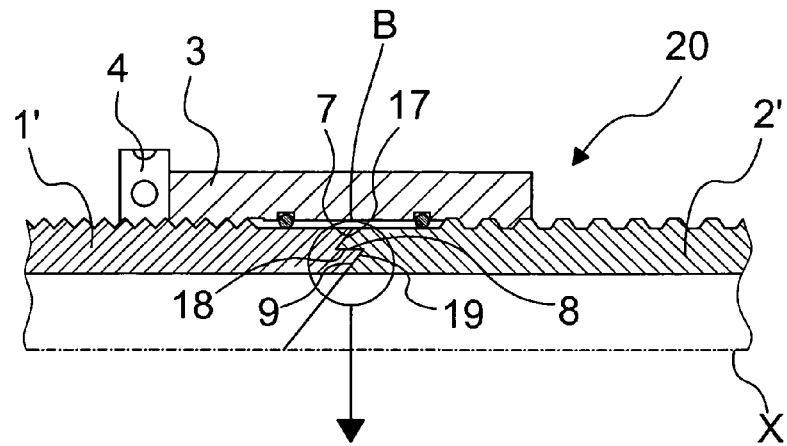
FIG. 5*a* shows another embodiment of the invention.

The mounting procedure of the joint 20 is similar to the make up procedure described above. Moreover, as in this embodiment the joint 20 is provided also with metal to metal seal 8, 18, as illustrated in the embodiments of FIGS. 5a and 5b, the last rotation of the coupling 3 also ensures that the pin ends surfaces 7 and 9 contact the respective complementary pin end surfaces 17 and 19, at the same time energizing the seal 8, 18, thus increasing the sealability of the whole joint 20.

The same occurs in the other embodiments of the sealing surfaces 8', 18', 8", 18", 8''', 18''' respectively illustrated in FIGS. 6a, 6b, 6c.

Also this embodiment of the joint can be provided with a tapered threading on one or on both pins 1', 2'.

It can be also envisaged to use seals energizable by means of external pressure or self-energizable, though such instances are not illustrated.

The joint of the invention also has other advantages:

A low make-up torque, as the tubes need not be rotated, the torque needed to overcome the friction against the ground is completely eliminated;

Only a low breakout torque is needed to open the joint intentionally as there is no screw interference, and no "fillers" are used during make-up operations, i.e. no chemical materials are used to fill, seal or fasten the joint.

The invention claimed is:

1. A threaded joint comprising:
a female threaded sleeve, defined as the coupling, a first male pipe with a respective threaded end portion, defined as a first pin, a second male pipe with a respective threaded end portion, defined as a second pin, the first pin being configured to be made up in a first threaded portion of the coupling and the second pin being configured to be made up in a second threaded portion of the coupling such that the first pin and the second pin are substantially axially aligned on a common longitudinal axis,
the threaded end portion of the first pin having a pitch that is different from a pitch of the threaded end portion of the second pin, the first pin and the second pin each having an end with an oblique shape such that a portion of the end is longitudinally longer than a circumferentially opposite portion of the end, each end comprising at least one contact surface,
the at least one contact surface of the first pin and the at least one contact surface of the second pin configured to be in contact after the joint is made-up, and
the at least one contact surface of the first pin and the at least one contact surface of the second pin lying on a first plane that is non-parallel with and non-perpendicular to the longitudinal axis, whereby the at least one contact surface of each of the of the first and second pins defines an annulus of elliptic shape on the first plane, wherein the entire circumference of the annulus of elliptic shape is on the first plane.

2. The threaded joint according to claim 1, wherein said first pin has frustoconical threading converging in the direction of the end of said first pin.

3. The threaded joint according to claim 2, wherein both said first and second pins have frustoconical threading, a taper angle of the threading of the first pin being different from a taper angle of the threading of the second pin.

4. The threaded joint according to claim 1, further comprising a back nut disposed on at least one of the first and second pins.

5. The threaded joint according to claim 1, wherein the threaded end portions of the first and second pins have the same thread orientation.

6. The threaded joint according to claim 1, wherein the first plane is at an angle that is greater than or equal to about 45° and less than about 90° from the longitudinal axis.

7. The threaded joint according to claim 1, wherein the first plane is at an angle of about 60° to about 75° from the longitudinal axis.

8. The threaded joint according to claim 1, further comprising a seal ring disposed between the coupling and each of the first and second pins.

9. The threaded joint according to claim 8, wherein at least one of the seal rings is elastomeric.

10. The threaded joint according to claim 1, wherein the threaded sleeve further comprises longitudinally spaced-apart seal rings on an inner surface of the threaded sleeve, and wherein the inner surface has a substantially constant diameter along the longitudinal length between the seal rings.

11. The threaded joint of claim 1, wherein the at least one contact surface of the first pin extends around the first end, and the at least one contact surface of the second pin extends around the second end.

12. A threaded joint comprising:
a female threaded sleeve, defined as the coupling, a first male pipe with a respective threaded end portion, defined as a first pin, a second male pipe with a respective threaded end portion, defined as a second pin, the first pin being configured to be made up in a first threaded portion of the coupling and the second pin being configured to be made up in a second threaded portion of the coupling such that the first pin and the second pin are substantially axially aligned on a common longitudinal axis,
the threaded end portion of the first pin having a pitch that is different from a pitch of the threaded end portion of the second pin, the first pin and the second pin each having an end with an oblique shape such that a portion of the end is longitudinally longer than a circumferentially opposite portion of the end, each end comprising at least one contact surface,
the at least one contact surface of the first pin and the at least one contact surface of the second pin configured to be in contact after the joint is made-up,
the at least one contact surface of the first pin and the at least one contact surface of the second pin lying on a first plane that is non-parallel with and non-perpendicular to the longitudinal axis, whereby the at least one contact surface of each of the of the first and second pins defines an annulus of elliptic shape on the first plane, and
the first and second pins each having respective first and second contact surfaces, each of the first contact surfaces being disposed along the first plane and each of the second contact surfaces being disposed along a second plane, the first and second planes being non-coplanar.

13. The threaded joint according to claim 12, wherein the first and second planes are substantially parallel.

14. The threaded joint according to claim 12, wherein the first and second planes are substantially not parallel.

15. The threaded joint according to claim 12, wherein the first and second pins each further comprise a third contact surface, each third contact surface intersecting the first and second contact surfaces of the respective pin.

16. The threaded joint according to claim 15, wherein the third contact surface of the first pin is configured to form a seal with the third contact surface of the second pin when the joint is made-up.

17. The threaded joint according to claim 16, wherein the third contact surface of the first pin is frustoconical and the third contact surface of the second pin is curved.

18. A threaded joint having a longitudinal axis, the joint comprising:
a coupling comprising a first threaded portion and a second threaded portion;
a first pin with a first end configured to be made up in the first threaded portion of the coupling, the first end having an oblique shape such that a portion of the first end is longitudinally longer than a circumferentially opposite portion of the first end;
a second pin with a second end configured to be made up in the second threaded portion of the coupling, the second end having an oblique shape such that a portion of the second end is longitudinally longer than a circumferentially opposite portion of the second end; and
wherein the end of the first pin and the end of the second pin are configured to slidingly engage along a plane disposed at an angle greater than about 0° and less than about 90° with respect to the longitudinal axis, thereby providing a wedge effect between the ends when the first and second pins are made up in the coupling; and wherein the engaged end of the first and second pins define an annulus of elliptic shape on a plane, wherein the entire circumference of the annulus of elliptic shape is on the plane.

19. The threaded joint according to claim 18, wherein the first and second threaded portions of the coupling have the same thread orientation.

20. The threaded joint according to claim 18, wherein the first threaded portion of the coupling has a different thread pitch than the second threaded portion of the coupling.

21. The threaded joint according to claim 18, wherein the end of the first pin and the end of the second pin are further configured to form a seal therebetween.

22. The threaded joint according to claim 21, wherein one of the first and second pins further comprises a frustoconical contact surface and the other of the first and second pins further comprises a curved contact surface.

23. The threaded joint according to claim 18, wherein the coupling further comprises longitudinally spaced-apart seal rings on an inner surface of the coupling, wherein the inner surface has a substantially constant diameter along the longitudinal length between the seal rings.

* * * * *

UNITED STATES PATENT AND TRADEMARK OFFICE
CERTIFICATE OF CORRECTION

| | | |
|---|---|---|
| PATENT NO. | : 9,004,544 B2 | Page 1 of 1 |
| APPLICATION NO. | : 13/264731 | |
| DATED | : April 14, 2015 | |
| INVENTOR(S) | : Carcagno et al. | |

It is certified that error appears in the above-identified patent and that said Letters Patent is hereby corrected as shown below:

In the specification

Column 2 line 36, change "2006/0273586relates" to --2006/0273586 relates--.

Column 5 line 40, change "Cylindricscrewal surfaces." to --Cylindrical surfaces.--.

In the claims

Column 10 line 37, Claim 1, change "of the of the" to --of the--.

Signed and Sealed this
Tenth Day of May, 2016

Michelle K. Lee
*Director of the United States Patent and Trademark Office*